United States Patent
Hall

(10) Patent No.: US 6,763,455 B2
(45) Date of Patent: Jul. 13, 2004

(54) MASKING LOGICAL UNIT NUMBERS IN A SHARED DATA STORAGE SYSTEM

(75) Inventor: Trevor Hall, Glossop (GB)

(73) Assignee: Fujitsu Services Limited, Slough (GB)

(*) Notice: Subject to any disclaimer, the term of this patent is extended or adjusted under 35 U.S.C. 154(b) by 603 days.

(21) Appl. No.: 09/758,996

(22) Filed: Jan. 11, 2001

(65) Prior Publication Data

US 2001/0016904 A1 Aug. 23, 2001

(30) Foreign Application Priority Data

Feb. 10, 2000 (GB) ............................................. 0002909

(51) Int. Cl.$^7$ ...................... G06F 15/177; G06F 12/00
(52) U.S. Cl. ............................. 713/1; 711/111; 711/114
(58) Field of Search ........................ 713/1, 2; 711/114, 711/150, 154, 111

(56) References Cited

U.S. PATENT DOCUMENTS

| | | | |
|---|---|---|---|
| 5,101,490 A | | 3/1992 | Getson |
| 5,652,839 A | * | 7/1997 | Giorgio et al. ............. 709/224 |
| 5,802,547 A | * | 9/1998 | Legvold ..................... 711/100 |
| 5,996,030 A | | 11/1999 | Ofer |
| 6,073,218 A | * | 6/2000 | DeKoning et al. .......... 711/150 |
| 6,115,772 A | * | 9/2000 | Crater ........................ 710/306 |
| 6,260,120 B1 | * | 7/2001 | Blumenau et al. .......... 711/152 |
| 6,295,575 B1 | * | 9/2001 | Blumenau et al. ............. 711/5 |
| 6,438,648 B1 | * | 8/2002 | McKean et al. ............ 711/114 |
| 6,513,074 B1 | * | 1/2003 | Dimitri et al. .................. 710/1 |
| 6,542,961 B1 | * | 4/2003 | Matsunami et al. ........ 711/114 |

FOREIGN PATENT DOCUMENTS

| | | |
|---|---|---|
| EP | 0935375 A1 | 8/1999 |
| WO | WO 99/67713 A1 | 12/1999 |
| WO | WO 00/00889 A1 | 1/2001 |

OTHER PUBLICATIONS

Yitzhak Birk, "Random RAIDs with Selective Exploitation of Redundancy for High Performance Video Server", pp 13–23.*

"Emulex LightPulse 6/7/8000 PCT fibre Channel Host Adaptor ACSIport Information", Dec. 14, 1999, Emulex Corporation.

* cited by examiner

*Primary Examiner*—Thomas Lee
*Assistant Examiner*—Chun Cao
(74) *Attorney, Agent, or Firm*—Barnes & Thornburg LLP

(57) ABSTRACT

A computer system has at least two processing nodes and a shared data storage system comprising a number of storage units. Each storage unit has a logical unit number (LUN). A first of the processing nodes stores a maximum LUN value in non-volatile storage, and is arranged to perform, on boot-up, a device discovery procedure in which it scans the shared data storage system to find storage units with LUNs not greater than the maximum LUN value. A second of the processing nodes stores a start LUN value in non-volatile storage, and is arranged to perform, on boot-up, a device discovery procedure in which it scans the shared data storage system to find storage units with LUNs not less than the start LUN value. This allows LUN masking to be achieved relatively inexpensively with only minimal modification to the operating systems of the processing nodes, using existing device discovery features of the operating system.

10 Claims, 2 Drawing Sheets

```
READ MAXLUN FROM NVRAM
FOR EACH HBA
    FOR EACH TARGET DEVICE
        SEND TEST UNIT READY
        IF VALID RESPONSE RECEIVED
            FOR LUN=0 TO MAXLUN
                SEND INQUIRY
                SAVE RETURNED DATA
            NEXT LUN
        END IF
    NEXT TARGET DEVICE
NEXT HBA
```

*FIG. 2*

```
FOR EACH HBA
    READ STARTLUN FROM CONFIGURATION FILE
    FOR EACH TARGET DEVICE
        SEND TEST UNIT READY
        IF VALID RESPONSE RECEIVED
            FOR LUN=STARTLUN TO STARTLUN + 31
                SEND INQUIRY
                SAVE RETURNED DATA
            NEXT LUN
        END IF
    NEXT TARGET DEVICE
NEXT HBA
```

MASKING LOGICAL UNIT NUMBERS IN A SHARED DATA STORAGE SYSTEM

BACKGROUND TO THE INVENTION

This invention relates to a method and apparatus for masking logical unit numbers in a shared data storage system.

A data storage system typically consists of an array of disk units and one or more storage controllers. The disks may be accessed using the well-known SCSI protocol, over a Fibre Channel (FC) connection. Within a SCSI storage system, groups of disks are bound into logical storage units, each of which is assigned a logical unit number (LUN). Under SCSI, a storage unit is addressed by a SCSI target address, which selects a particular storage controller, and by the LUN, which selects one of the storage units connected to that controller. For a stand-alone disk, the LUN is always zero.

Such a storage system may be shared between two or more processing nodes, possibly running under different operating systems. In such a case, it is necessary to provide some form of LUN masking, to ensure that each node can access only its own LUNs, and cannot access LUNs belonging to another node.

There are two approaches currently being taken to LUN masking. In a first approach, LUN masking is performed within each storage controller, using the Worldwide Name (WWN) of the FC Host Bus Adapter (HBA) of each processing node to map LUNs on to the nodes. In a second approach, LUN masking is performed within each processing node, using the unique WWN of the storage controller. Masked LUNs are hidden from the operating system.

Both of these known LUN masking techniques require special software, running either within the storage system, or in the processing nodes. Such software is generally expensive.

The object of the invention is to provide a novel solution to the problem of LUN masking, which is less expensive than known solutions.

SUMMARY OF THE INVENTION

According to the invention a method of masking logical unit numbers comprises the steps:

- storing a maximum LUN value in non-volatile storage in a first processing node;
- storing a start LUN value in non-volatile storage in a second processing node;
- causing the first processing node to perform, on boot-up, a device discovery procedure in which it scans a shared data storage system to find storage units with LUNs not greater than the maximum LUN value; and
- causing the second processing node to perform, on boot-up, a device discovery procedure in which it scans the shared data storage system to find storage units with LUNs not less than the start LUN value.

It will be shown that the invention allows LUN masking to be achieved relatively inexpensively with only minimal modification to the operating systems of the processing nodes, using existing device discovery features of the operating system.

BRIEF DESCRIPTION OF THE DRAWINGS

FIG. 2 illustrates a device discovery operation performed at boot-up in one of the processing nodes.

FIG. 3 illustrates a device discovery operation performed at boot-up in another of the processing nodes.

DESCRIPTION OF AN EMBODIMENT OF THE INVENTION

Figure 1:
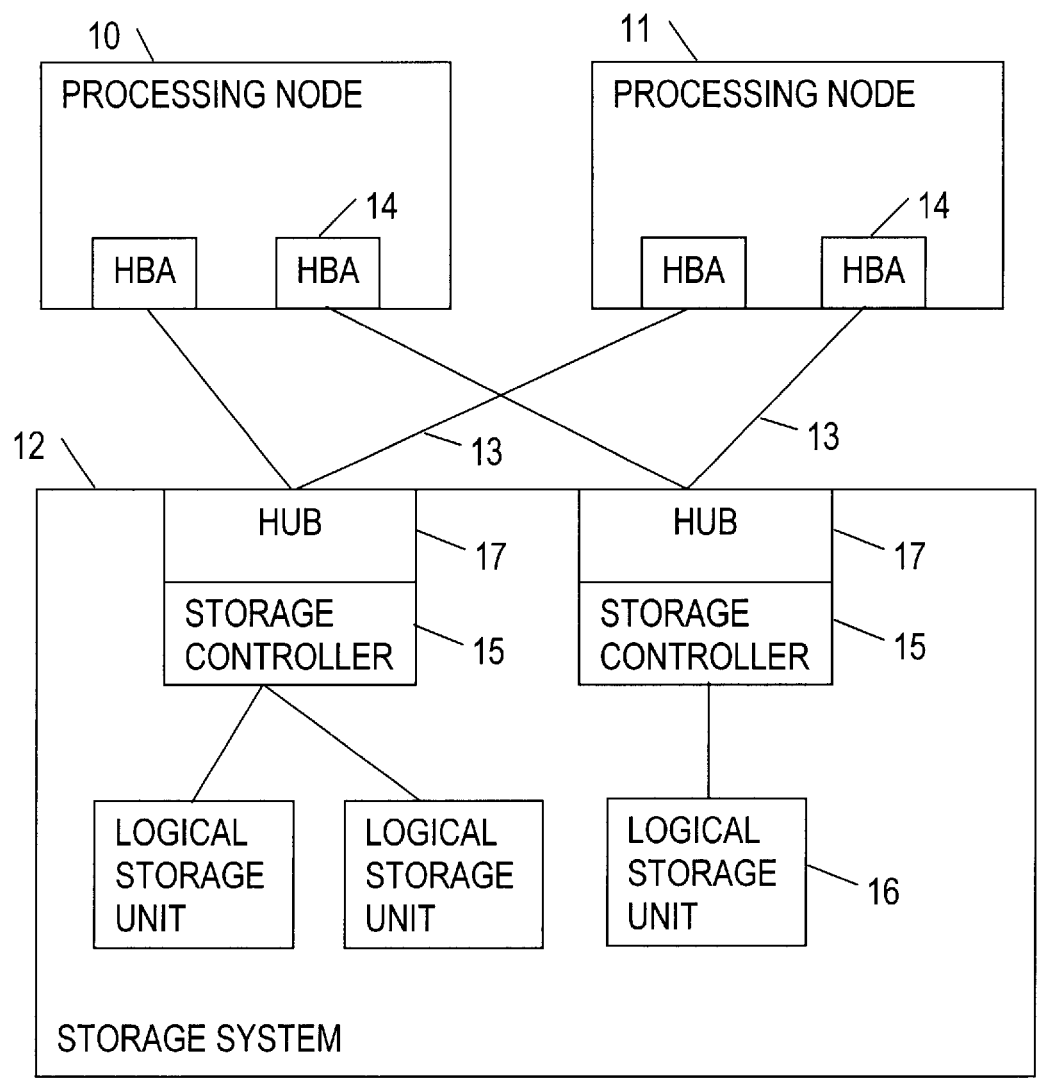
FIG. 1 is a block diagram of a computer system, comprising a number of processing nodes and shared storage.

One LUN masking technique in accordance with the invention will now be described by way of example with reference to the accompanying drawings.

FIG. 1 shows a computer system comprising a number of processing nodes 10, 11 and a shared data storage system 12. The storage system is connected to the processing nodes by way of Fibre Channel (FC) loops 13, using the FCP SCSI-3 protocol.

Each of the processing nodes 10, 11 runs a particular operating system. In this example, node 10 runs the ICL VME operating system, while node 11 runs either the Windows NT operating system, or the Unix operating system. [Windows NT is a registered trademark of Microsoft Corporation in the USA and/or other countries. Unix is a registered trademark of The Open Group]. Each processing node includes one or more FC Host Bus Adaptors (HBAs) 14, for connecting the node to the Fibre Channel loops.

In the present example, the storage system 12 is an EMC CLARiiON C5700 Storage Array. It includes two storage controllers 15, with built in two port hubs 17. Each controller has a number of logical storage units 16 associated with it. Each logical storage unit 16 typically comprises a RAID group of disks.

Each storage controller 15 has a Fibre Channel loop identity (ID). Each logical storage unit 16 is assigned a logical unit number (LUN) which, in this case, is unique within the storage system. A logical storage unit is addressed by the combination of the loop ID of its storage controller, and its LUN.

At loop initialization time, the loop IDs of all devices (HBAs, storage controllers) connected to each FC loop are circulated around the loop. These IDs are stored within each HBA. From the Fibre Channel process login parameters, it is possible to determine which devices are initiators (in this case, the HBAs), and which are targets (in this case, the storage controllers).

At boot-up time, each of the processing nodes 10, 11 performs a device discovery (or "grope") procedure, in which it attempts to determine which devices are connected to the node.

FIG. 2 is a pseudo-code representation of the grope procedure for the Windows NT or Unix node 11. It should be noted that this grope procedure is conventional for Windows NT or Unix systems, and hence does not require any special software or modification to the operating system.

The procedure first accesses local disk or non-volatile random-access memory (NVRAM) in the node, to read a device driver parameter, referred to herein as MAXLUN. This parameter specifies the maximum number of LUNs the node is allowed to grope; for example a value MAXLUN=8 allows LUNs 0 to 7 to be groped. Conventionally, MAXLUN would be set to the highest LUN value known to be available. The purpose of this is to reduce system boot time by ensuring that the node does not waste time looking for LUNs that do not exist. However, in the present system, instead of being set to the highest LUN value known to be available, MAXLUN is set to the highest LUN value that the Unix or NT node 11 is to be allowed to access. This ensures that any higher LUNs are not accessible to this node.

The grope procedure then selects each of the HBAs in the node, and sends a SCSI TEST UNIT READY command to each target device (i.e. storage controller) attached to that HBA. If there is no response from a controller within a predetermined timeout period, it moves on to the next controller.

If a valid response is received from a storage controller, the procedure sends a series of SCSI INQUIRY commands to that controller, with LUN values 0 up to MAXLUN. The returned INQUIRY data includes the vendor identity, device type, and a peripheral qualifier. The peripheral qualifier indicates whether the device is "present and currently connected" or "supported but not currently connected". This latter status value is used in dual path systems where a LUN may be owned by either of two storage controllers. The returned data is added to a device table, which is available for use by the operating system.

FIG. 3 is a pseudo-code representation of the grope procedure for the ICL VME node 10.

The VME node has a configuration file, stored on a local disk. For each VME controller in the node (essentially an I/O path that maps on to a particular HBA) the configuration file holds an entry, referred to herein as STARTLUN, that tells VME which LUN to start from for that HBA.

The grope procedure selects each HBA, and reads the appropriate STARTLUN from the configuration file. It then sends a SCSI TEST UNIT READY command to each target device (i.e. storage controller) attached to that HBA. If there is no response from a controller within a predetermined timeout period, it moves on to the next controller.

If a valid response is received from a storage controller, the procedure sends a series of SCSI INQUIRY commands to that controller, with LUN values from STARTLUN up to STARTLUN+31. As before the returned INQUIRY data is added to a device table which is available for use by the operating system.

The grope procedure described above with reference to FIG. 3 is similar to the conventional VME grope procedure, except that it is modified to scan upwards from STARTLUN, rather than from zero up to a specified maximum LUN value. This ensures that any lower LUNs are not accessible to this node. The amount of modification of the VME operating system required to achieve this is minimal, and no other special software is required.

In summary, it can be seen that in the system described above, each of the processing nodes 10, 11 has access to a separate set of LUNs, and cannot access the LUNs belonging to the other node. For example, if MAXLUN is set to 8, then the NT/Unix node 11 can access only LUNs 0 to 7, and if STARTLUN is set to 8, then the VME node 10 can access only LUNs 8 to 39.

Some Possible Modifications

It will be appreciated that many modifications may be made to the system described above without departing from the scope of the present invention.

Although in the above example the system includes a VME node and a Window NT or Unix node, other combinations are possible. In particular, it is possible to include several VME nodes. By suitably choosing the STARTLUN parameters of each node, it is possible to ensure that each of these nodes can access only its own LUNs. For example, if two VME nodes have STARTLUN values of 8 and 40 respectively, the first will recognise LUNs from 8 to 39, and the second from 40 to 71.

In the embodiment described above, the VME node scans LUNs from STARTLUN up to STARTLUN+31, limiting the number of LUNs to a maximum of 32 per VME controller. However, in an alternative embodiment of the invention, the configuration file may hold an STOPLUN value, in addition to STARTLUN, for each VME controller. In this case, the grope procedure is arranged to scan from STARTLUN up to STOPLUN.

It will be appreciated that the invention is not restricted to the use of Fibre Channel; for example, conventional SCSI connections may be used.

Instead of RAID arrays, some or all of the logical storage units may comprise stand-alone disks or tape units.

What is claimed is:

1. A method of masking logical unit numbers (LUNs) comprising the steps:

storing a first parameter in non-volatile storage in a first processing node, said first parameter defining a first range of LUN values;

storing a second parameter in non-volatile storage in a second processing node, said second parameter defining a second range of LUN values, non-overlapping with said first range of LUN values;

causing the first processing to perform, on boot-up, a device discovery procedure which scans a shared data system to find storage units with LUNs in said first range of LUN values; and causing the second processing node to perform, on boot-up, a device discovery procedure which scans the shared data storage system to find storage units with LUNs in said second range of LUN values.

2. A method according to claim 1 wherein:

said first parameter defines a maximum LUN value;

said first range of LUN values comprises LUN values not greater than said maximum LUN value;

said second parameter defines a start LUN value; and said second range of LUN values comprises LUN values not less than said start LUN value.

3. A method according to claim 2 wherein the device discovery procedure in the second of the processing nodes scans the shared data storage system to find storage units with LUNs in a range between the start LUN value and the start LUN value plus a predetermined constant value.

4. A according to claim 2 wherein the second of the processing nodes also stores a stop LUN value in non-volatile storage, and wherein the device discovery procedure in the second of the processing nodes scans the shared data storage system to find storage units with LUNs in a rang between the start LUN value and the stop LUN value.

5. A method according claim 1 wherein the processing nodes are connected to the data storage system by way of Fibre Channel connection, using the SCSI protocol.

6. A computer system comprising:

at least two processing nodes; and a shared data storage system comprising a plurality of storage units, each having a logical unit number (LUN) associated with it;

wherein a first of the processing nodes stores a first parameter in non-volatile storage, said first parameter defining a first range of LUN values, and includes means for performing, on boot-up, a device discovery procedure which scans the shared data storage to find storage units with LUNs in said first range of LUN values;

and wherein a second of the processing nodes stores a second parameter in non-volatile storage, said second parameter defining a second range of LUN values, non-overlapping with said first range of LUN values, and includes means for performing, on boot-up, a device discovery procedure which scans the shared data storage system to find storage units with LUNs in said second range of LUN values.

7. A computer system according to claim 6 wherein:

said first parameter defines a maximum LUN value;

said first range of LUN comprises LUN values not greater than said maximum LUN value;

said second parameter defines a start LUN value; and said second range of LUN values comprises LUN values not less than said start LUN value.

8. A computer system according to claim 7 wherein the second of the processing nodes includes means or scanning the shared data storage system to find storage units with LUNs in a range between the start LUN value and the start LUN value plus a predetermined constant value.

9. A computer system according to claim 7 wherein the second of the processing nodes also stores a stop LUN value in non-volatile storage, and wherein the second of the processing nodes includes means for scanning the shared data storage system to find storage units with LUNs in a range between the start LUN value and the stop LUN value.

10. A computer system according to claim 6 wherein the processing nodes are connected to the data stomp by way of a Fibre Channel connection, using the SCSI protocol.

* * * * *